(12) United States Patent
Jang et al.

(10) Patent No.: US 10,040,253 B2
(45) Date of Patent: Aug. 7, 2018

(54) THREE-DIMENSIONAL PRINTING CONTROL APPARATUS AND METHOD

(71) Applicant: SAMSUNG SDS CO., LTD., Seoul (KR)

(72) Inventors: Sung-Ho Jang, Seoul (KR); In-Hyok Cha, Seoul (KR); Yong-Wook Jeong, Seoul (KR); Sang-Hoon Han, Seoul (KR); Kwang-Min Choi, Seoul (KR); Jae-Young Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 259 days.

(21) Appl. No.: 14/926,589

(22) Filed: Oct. 29, 2015

(65) Prior Publication Data

US 2016/0121549 A1 May 5, 2016

(30) Foreign Application Priority Data

Oct. 31, 2014 (KR) .......................... 10-2014-0149811

(51) Int. Cl.
*B29C 67/00* (2017.01)
*B29C 64/386* (2017.01)
*B33Y 50/02* (2015.01)

(52) U.S. Cl.
CPC ........ *B29C 67/0088* (2013.01); *B29C 64/386* (2017.08); *B33Y 50/02* (2014.12)

(58) Field of Classification Search
None
See application file for complete search history.

(56) References Cited

U.S. PATENT DOCUMENTS

2010/0291505 A1* 11/2010 Rawley .............. A61C 13/0004
433/72

FOREIGN PATENT DOCUMENTS

CN 101117062 A 2/2008

OTHER PUBLICATIONS

Communication issued by the State Intellectual Property Office of P.R. China dated Jul. 4, 2017 in counterpart Chinese Patent Application No. 201510707854.8.

* cited by examiner

*Primary Examiner* — Mohammad Ali
*Assistant Examiner* — Saad M Kabir
(74) *Attorney, Agent, or Firm* — Sughrue Mion, PLLC

(57) ABSTRACT

A three-dimensional printing control apparatus comprises a control command generator configured to: generate a control command for outputting a three-dimensional object having a first shape, and generate, in response to a request for changing a shape of the three-dimensional object from the first shape to a second shape is received while performing a output work for the three-dimensional object, an additional control command for outputting a changed three-dimensional object having the second shape; and a control command transmitter configured to, in response to determining that it is possible to output the changed three-dimensional object through the output work, substitute the additional control command for the control command with respect to a non-printed portion of the three-dimensional object.

20 Claims, 2 Drawing Sheets

THREE-DIMENSIONAL PRINTING CONTROL APPARATUS AND METHOD

CROSS-REFERENCE TO RELATED APPLICATION

This application claims priority to and the benefit of Korean Patent Application No. 10-2014-0149811, filed on Oct. 31, 2014, the disclosure of which is incorporated herein by reference in its entirety.

BACKGROUND

1. Field

Exemplary embodiments of the present disclosure relate to a three-dimensional printing control apparatus and method, and more particularly, to technology for controlling a work of outputting a three-dimensional object in a three-dimensional printer.

2. Discussion of Related Art

A three-dimensional printer outputs a three-dimensional object having a three-dimensional shape by injecting and stacking a printing material such as solid, powder, liquid polymer, etc. When a request for changing the shape of the three-dimensional object is received while performing a work outputting the three-dimensional object, a conventional three-dimensional printer cannot perform the work outputting the three-dimensional object by reflecting the request while performing a current output work. In order to output the three-dimensional object changed into a shape that a user desires, the output work which is currently being performed should be suspended or completed. Accordingly, there is a problem of an interrupt due to the suspension of a work or a delay due to a work standby. Further, the three-dimensional printing technology which is a method of stacking the printing material has a problem in which a cost of the material is expensive and a work speed is slow compared with a cutting work. As a result, when manufacturing a three-dimensional result product by changing the shape of the three-dimensional object while outputting the three-dimensional object, a waste of the printing material and an increase of a lead time can be prevented.

SUMMARY

The present disclosure is directed to a three-dimensional printing control apparatus and method for controlling a three-dimensional printer of outputting a three-dimensional object by stacking a material.

According to one aspect of the present disclosure, there is provided a three-dimensional printing control apparatus, comprising: a control command generator configured to: generate a control command for outputting a three-dimensional object having a first shape, and generate, in response to a request for changing a shape of the three-dimensional object from the first shape to a second shape is received while performing a output work for the three-dimensional object, an additional control command for outputting a changed three-dimensional object having the second shape; and a control command transmitter configured to, in response to determining that it is possible to output the changed three-dimensional object through the output work, substitute the additional control command for the control command with respect to a non-printed portion of the three-dimensional object.

The control command transmitter is configured to, in response to determining that it is possible to output the changed three-dimensional object through the output work, transmit the additional control command substituted for the control command to a three-dimensional printer that is performing the output work.

The control command transmitter is further configured to: identify a specific portion of the changed three-dimensional object, and determine whether it is possible to output the changed three-dimensional object instead of the three-dimensional object through the output work when the specific portion is output instead of at least one portion of the non-printed portion in the output work, the specific portion is a portion of the three-dimensional object that is changed from the first shape to the second shape according to the request.

The control command comprises sub-control commands for each of a plurality of layers for allowing a three-dimensional printer to stack a material and output the three-dimensional object, and the additional control command comprises sub-control commands for each of a plurality of layers for allowing the three-dimensional printer to stack the material and output the changed three-dimensional object.

The control command transmitter is further configured to: sequentially transmit the sub-control commands of the control command for each of the plurality of layers for the output work to the three-dimensional printer one by one, and suspend, in response to determining that it is possible to output the changed three-dimensional object through the output work, the sequential transmission of the sub-control commands of the control command while sequentially transmitting at least a portion of the sub-control commands of the additional control command for outputting the changed three-dimensional object.

The control command transmitter is further configured to: compare a position in which the output of the non-printed portion is started according to the control command in a build space of a three-dimensional printer that is performing the output work and a position in which the output of the specific portion is started according to the additional control command in the build space, and determine whether it is possible to output the changed three-dimensional object through the output work based on a result of the comparison.

The control command generator is further configured to: generate the control command based on first modeling information with respect to the three-dimensional object, and generate the additional control command based on second modeling information with respect to the changed three-dimensional object.

The three-dimensional printing control apparatus may further comprising: a modeling converter configured to convert the first modeling information into the second modeling information according to the request.

The modeling converter is further configured to provide a notification indicating the non-printed portion.

The three-dimensional printing control apparatus may further comprising: a printer monitor configured to obtain status information with respect to a three-dimensional printer that is performing the output work, wherein the modeling converter is further configured to provide the notification based on obtained the status information.

According to another aspect of the present disclosure, there is provided a three-dimensional printing control method, comprising: generating a control command for outputting a three-dimensional object having a first shape; generating in response to a request for changing a shape of the three-dimensional object from the first shape to a second shape is received while performing a output work for the three-dimensional object, an additional control command for outputting the three-dimensional object having the second shape; and substituting, in response to determining that it is possible to output the changed three-dimensional object through the output work, the additional control command for the control command with respect to a non-printed portion of the three-dimensional object.

The three-dimensional printing control method may further comprising: transmitting, in response to determining that it is possible to output the changed three-dimensional object through the output work, the additional control command substituted for the control command to a three-dimensional printer that is performing the output work.

The three-dimensional printing control method may further comprising: identifying a specific portion of the changed three-dimensional object; and determining whether it is possible to output the changed three-dimensional object instead of the three-dimensional object through the output work when the specific portion is output instead of at least one portion of the non-printed portion in the output work, wherein the specific portion is a portion of the three-dimensional object that is changed from the first shape to the second shape according to the request.

The control command comprises sub-control commands for each of a plurality of layers for allowing a three-dimensional printer to stack a material and output the three-dimensional object, and the additional control command comprises sub-control commands for each of a plurality of layers for allowing the three-dimensional printer to stack the material and output the changed three-dimensional object.

The three-dimensional printing control method may further comprising: sequentially transmitting the sub-control commands of the control command for each of the plurality of layers for the output work to the three-dimensional printer one by one; and suspending, in response to determining that it is possible to output the changed three-dimensional object through the output work, the sequential transmission of the sub-control commands of the control command while sequentially transmitting at least a portion of the sub-control commands of the additional control command for outputting the changed three-dimensional object.

The determining whether it is possible to output the changed three-dimensional object may further comprising: comparing a position in which the output of the non-printed portion is started according to the control command in a build space of a three-dimensional printer that is performing the output work and a position in which the output of the specific portion is started according to the additional control command in the build space; and determining whether it is possible to output the changed three-dimensional object through the output work based on a result of the comparing.

The generating the control command comprises generating the control command based on first modeling information with respect to the three-dimensional object, and the generating the additional control command comprises generating the additional control command based on second modeling information with respect to the changed three-dimensional object.

The three-dimensional printing control method may further include: converting the first modeling information into the second modeling information according to the request.

The three-dimensional printing control method may further include: providing a notification indicating the non-printed portion.

The three-dimensional printing control method may further comprising: obtaining status information with respect to a three-dimensional printer that is performing the output work; and providing a notification indicating the non-printed portion based on the obtained status information.

According to still another aspect of the present disclosure, there is provided a computer program stored on a non-transitory storage medium for controlling a hardware to execute the method described above.

According to still another aspect of the present disclosure, there is provided a three-dimensional printing control apparatus, comprising: a transmitter configured to communicate with a three-dimensional printer; a memory having stored thereon computer program code; and a controller configured to execute the computer program code to: generate a first control command for instructing a printing of a three-dimensional object having a first shape by the three-dimensional printer; control the transmitter to transmit the first control command to the three-dimensional printer; generate, in response to receiving a request to change a shape of the three-dimensional object during the printing of the three-dimensional object, a second control command for instructing a printing of the three-dimensional object having a second shape; determine whether the three-dimensional object having the second shape is printable using a printed portion of the three-dimensional object having the first shape; substitute, in response to determining that the three-dimensional object having the second shape is printable using the printed portion of the three-dimensional object having the first shape, the second control command for the first control command with respect to a non-printed portion of the three-dimensional object; and control the transmitter to transmit the second control command substituted for the first control command to the three-dimensional printer.

The controller is further configured to execute the computer program code to: determine a changed portion of the three-dimensional object having the second shape that differs from the three-dimensional object having the first shape; determine whether the changed three-dimensional object is printable using the printed portion of the three-dimensional object having the first shape by comparing a currently printing portion of the three-dimensional object with the changed portion.

The printing of the three-dimensional object comprises the three-dimensional printer printing a plurality of layers of the three-dimensional object, and the controller is further configured to execute the computer program code to: determine at least one changed layer among the plurality of layers of the three-dimensional object having the second shape that differ from at least one corresponding layer of the plurality of layers of the three-dimensional object having the first shape; and determine, in response to a currently printed layer of the three-dimensional object being a lower layer than each of the at least one changed layers, that the three-dimensional object having the second shape is printable using the printed portion of the three-dimensional object having the first shape.

A lower layer is a layer that is to be printed by the three-dimensional printer before a higher layer.

The controller is further configured to execute the computer program code to: output, in response to determining that the three-dimensional object having the second shape is not printable using the printed portion of the three-dimensional object having the first shape, an inquiry regarding whether to stop the printing of the three-dimensional object to a user; and control, in response to receiving an instruction to stop printing the three-dimensional object, the transmitter to transmit a command to stop printing the three-dimensional object to the three-dimensional printer.

The controller is further configured to execute the computer program code to control, in response to receiving an instruction to continue printing the three-dimensional object having the first shape from the user, the transmitter to continue transmitting the first control command to the three-dimensional printer.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the disclosure will be described with reference to the accompanying drawings. The following description is provided in order to help a comprehensive understanding with respect to a method, apparatus, and/or system described herein. However, it is merely an example, and is not limited thereto.

In the following description with respect to exemplary embodiments of the present disclosure, when it is determined that a detailed description of well-known technology related to the present disclosure can unnecessarily obscure a subject matter of the present disclosure, the description will be omitted. All terms used herein are terms defined by considering functions in the disclosure, and may be different according to intentions of a user or an operator, or customs. Accordingly, the terms should be defined based on the description of this specification. The terms used herein are only for describing exemplary embodiments according to the disclosure, and should not be interpreted to limit the scope of the disclosure. Unless otherwise defined, the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Figure 1:
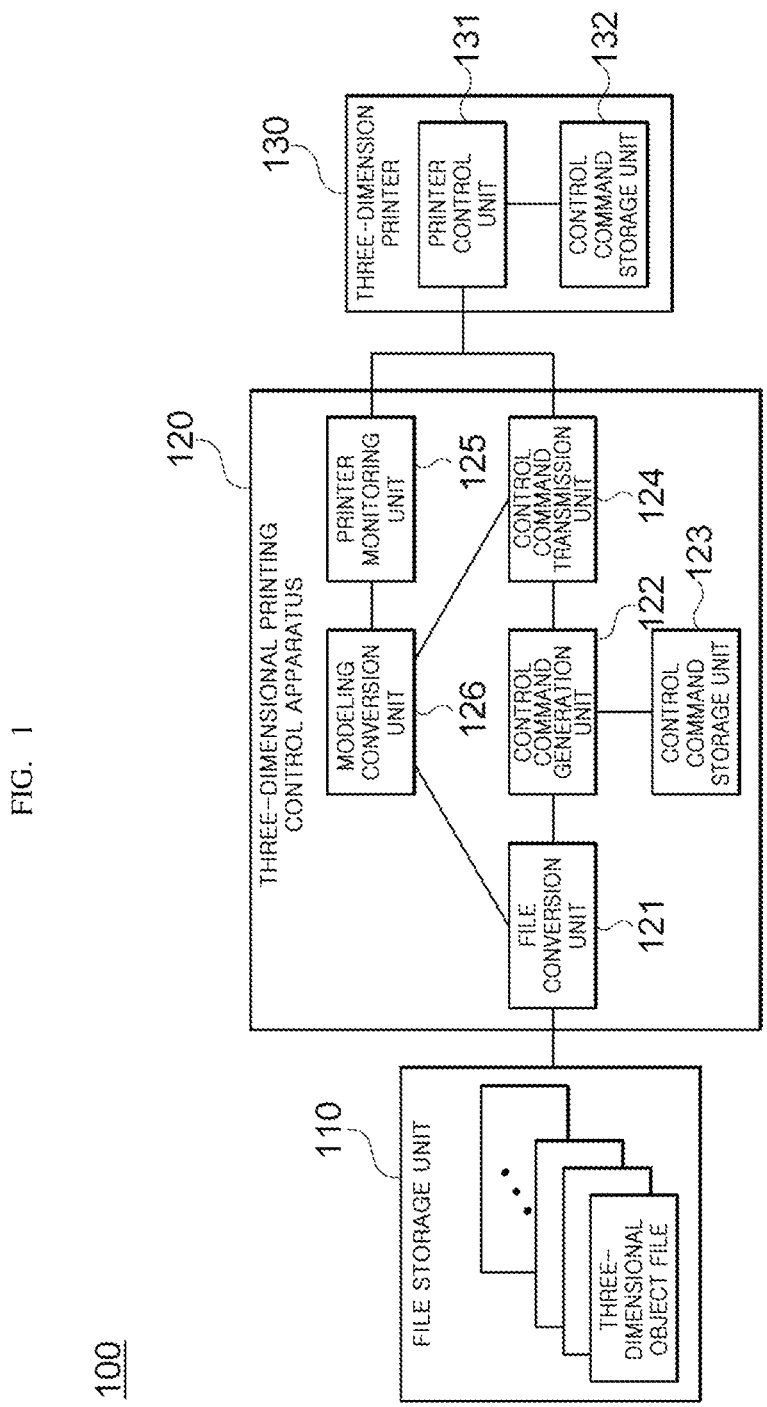
FIG. 1 is a block diagram illustrating a three-dimensional printing system according to an exemplary embodiment of the disclosure.

FIG. 1 is a block diagram illustrating a three-dimensional printing system according to an exemplary embodiment of the disclosure. As shown in FIG. 1, a three-dimensional printing system 100 according to an exemplary embodiment of the disclosure may include a file storage unit 110, a three-dimensional printing control apparatus 120, and a three-dimensional printer 130.

The file storage unit 110 may be configured to store a three-dimensional object file providing modeling information with respect to a three-dimensional object. For example, the file storage unit 110 may store three-dimensional object files having various formats such as a computer-aided design (CAD), a digital audio extraction (DAE), an object (OBJ), an extensible 3D (X3D), a web rule language (WRL), etc. Of course, the formats are merely examples, and the three-dimensional object files having other formats may be stored in the file storage unit 110.

According to several exemplary embodiments, the file storage unit 110 may include a computer-readable storage medium (for example, a hard disk and/or a memory) in a computing device (for example, a host computer connected to the three-dimensional printer 130 or a computer in which the three-dimensional printing control apparatus 120 is implemented), a local storage such as a direct-attached storage (DAS), and a network storage and/or a cloud storage such as a network-attached storage (NAS) or a storage area network (SAN). A user of the three-dimensional printing system 100 may generate a desired three-dimensional object file using a three-dimensional modeling tool such as a three-dimensional scanner, a CAD program, a three-dimensional image conversion program, etc. to store the file in the file storage unit 110 or download the three-dimensional object file from a three-dimensional contents market (for example, Thingiverse), a cloud-based three-dimensional printing service (for example, iMaterialise), and another three-dimensional file sharing system, etc. to the file storage unit 110 through a network.

The user may select the three-dimensional object file stored in the file storage unit 110, and request an output of the three-dimensional object represented by the three-dimensional object file. The three-dimensional printing control apparatus 120 may receive the user request, and obtain the selected three-dimensional object file from the file storage unit 110. In detail, according to exemplary embodiments, when a request for changing the shape of the three-dimensional object is received while outputting the three-dimensional object in which the output is requested as a physical result product having a three-dimensional shape under the control of the three-dimensional printing control apparatus 120, the three-dimensional printer 130 may output the physical result product of the three-dimensional object having the changed shape through the output work. For convenience of explanation, hereinafter, a build space of the three-dimensional printer 130 may be referred to as a working space in which the three-dimensional printer 130 manufactures the physical result product (for example, a space on a printer bed of the three-dimensional printer 130). That is, no result product generated by the three-dimensional printer 130 may be output outside the build space. Further, suppose that each single three-dimensional object file stored in the file storage unit 110 always represents the three-dimensional object capable of being output in the build space.

For example, the three-dimensional printing control apparatus 120 may be configured to perform the following control operations. The three-dimensional printing control apparatus 120 may receive the three-dimensional object file selected by the user from the file storage unit 110. In response to the selection of the user, the three-dimensional printing control apparatus 120 may obtain the modeling information with respect to the three-dimensional object represented by each three-dimensional object file. Further, the three-dimensional printing control apparatus 120 may generate a control command for outputting the three-dimensional object through the three-dimensional printer 130. The three-dimensional printing control apparatus 120 may generate the control command based on the modeling information with respect to the three-dimensional object. Next, the three-dimensional printing control apparatus 120 may transmit the generated control command to the three-dimensional printer 130. According to several exemplary embodiments, the three-dimensional printing control apparatus 120 may divide the generated control command into a plurality of sub-control commands corresponding to each of a plurality of material layers. Next, the three-dimensional printing control apparatus 120 may sequentially transmit the plurality of sub-control commands to the three-dimensional printer 130 one by one while the three-dimensional printer 130 performs the output work. Moreover, the three-dimensional printing control apparatus 120 may convert the modeling information by changing the shape of the three-dimensional object according to the request received during the output work, and represent the converted modeling information as a new three-dimensional object file. When it is possible to output the three-dimensional object having the changed shape through the current output work, the three-dimensional printing control apparatus 120 may generate another control command based on the new modeling information, and transmit the newly generated control command instead of an initial control command for a non-printed portion of the three-dimensional object to the three-dimensional printer 130.

The three-dimensional printer 130 may manufacture the result product having the three-dimensional shape using the printing material (for example, solid, powder, liquid polymer, etc.) by performing the output work according to the received control command. As shown in FIG. 1, the three-dimensional printer 130 may include a printer control unit 131 and a control command storage unit 132. The printer control unit 131 may store the control command received by the three-dimensional printer 130 in the control command storage unit 132, and control an operation of the three-dimensional printer 130 by reading the control command from the control command storage unit 132.

For example, the three-dimensional printer 130 may receive the sub-control commands for each layer, and perform the output work in a method of stacking material layers according to the received sub-commands for each layer. In detail, the output work of the three-dimensional printer 130 may be smoothly performed by transmitting the sub-control command for a next layer to the three-dimensional printer 130 in advance while outputting a material layer according to the sub-control command for a current layer. Further, when the output of the material layer is completed, the printer control unit 131 may delete the sub-control command for the current layer from the control command storage unit 132 in order to improve a memory usage rate of the three-dimensional printer 130. Further, the printer control unit 131 may generate status information by monitoring a progress status of the output work in units of layers, and transmit the generated status information to a printer monitoring unit 125 according to a request of the printer monitoring unit 125 or at a specific time (for example, when a specific event is generated or periodically).

Hereinafter, an exemplary implementation of the three-dimensional printing control apparatus 120 will be described in detail.

As shown in FIG. 1, the three-dimensional printing control apparatus 120 may include a file conversion unit 121, a control command generation unit (or a control command generator) 122, a control command storage unit 123, a control command transmission unit (or a control command transmitter) 124, a printer monitoring unit (a printer monitor) 125, and a modeling conversion unit (or a modeling converter) 126. Each module of the three-dimensional printing control apparatus 120 may be implemented by hardware. For example, the hardware may include a processor, a computer-readable storage medium which is accessible by the processor (for example, a volatile memory, a non-volatile memory and/or a storage device), an input device (for example, a pointing device such as a mouse, a keyboard, a touch sensing input device, a sound input device such as a microphone), an output device (for example, a display device, a printer, a speaker and/or a network card), at least one external device, and/or an interface device supporting communication with the input device and/or the output device. According to several exemplary embodiments, the three-dimensional printing control apparatus 120 may be implemented or included in a computing device such as a host computer connected to the three-dimensional printer 130 (through a serial port or a parallel port) or a computing device such as a server computer connected to the three-dimensional printer 130 through a network. According to several other exemplary embodiments, the three-dimensional printing control apparatus 120 may be implemented or included in the three-dimensional printer 130.

As described above, the user may select the three-dimensional object file (for example, each three-dimensional file may have a file format such as CAD, DAE, OBJ, X3D, or WRL) stored in the file storage unit 110, and request the output of the three-dimensional object represented by the three-dimensional object file. The file conversion unit 121 may receive the user request, and receive the selected three-dimensional object file from the file storage unit 110. Further, the file conversion unit 121 may convert each received three-dimensional object file into an output file (for example, a stereolithography (STL) file, or an action message format (AMF) file) of a common format in which the three-dimensional printer 130 supports. Further, the file conversion unit 121 may provide the converted file to several other modules (for example, the control command generation unit 122 and the modeling conversion unit 126). For convenience of explanation, hereinafter, suppose that the file conversion unit 121 provides the STL file.

The control command generation unit 122 may receive a single output file having the STL format from the file conversion unit 121. The control command generation unit 122 may generate the control command for outputting the three-dimensional object based on the received STL file. The generated control command may be stored in the control command storage unit 123.

The control command storage unit 123 may associate the control command with a specific identification (ID) in order to manage the control command. The control command generation unit 122 may transmit the control command stored in the control command storage unit 123 to the control command transmission unit 124 according to the need. Further, the control command transmission unit 124 may transmit the transmitted control command to the three-dimensional printer 130. For this, the control command transmission unit 124 may include a communication protocol supporting a serial connection, a parallel connection, and/or a network connection with the three-dimensional printer 130. The three-dimensional printer 130 may perform the output work while manipulating a header and/or a printer bed of the three-dimensional printer 130 using the control command. Accordingly, the three-dimensional object may be output in the build space of the three-dimensional printer 130 during the output work.

In several exemplary embodiments, the control command generation unit 122 may obtain data set for each layer by slicing polygon data in the received STL file (according to a thickness of the layer which is previously set by the user of the three-dimensional printing system 100 or by the three-dimensional printing control apparatus 120). The control command generation unit 122 may generate the control command of specifying a path for stacking the material, a speed of stacking the material, and/or a thickness of the material layer in the output work of the three-dimensional printer 130 using the data set for each layer. The three-dimensional printer 130 may stack the materials one by one according to the control command in order to output the three-dimensional object.

Further, since the control command includes a plurality of sub-control commands corresponding to each of the plurality of material layers, the control command may allow the three-dimensional printer 130 to perform the output work by stacking the material layers. For example, the control command generation unit 122 may divide the control command into a plurality of sub-control commands for each layer. The control command generation unit 122 may store the sub-control commands for each layer in the control command storage unit 123. The control command storage unit 123 may associate the sub-control commands for each layer with the specific ID in order to manage the sub-control commands for each layer. The control command generation unit 122 may transmit the sub-control commands for each layer stored in the control command storage unit 123 to the control command transmission unit 124 according to the need. The control command transmission unit 124 may transmit the transmitted sub-control commands for each layer to the three-dimensional printer 130.

According to several exemplary embodiments, the control command transmission unit 124 may sequentially transmit the sub-control commands for each layer to the three-dimensional printer 130 one by one according to the IDs of the sub-control commands for each layer. For example, the control command transmission unit 124 may determine whether the output work of the three-dimensional printer 130 is already started and is being performed (for example, based on the status information of the three-dimensional printer 130). When the output work of the three-dimensional printer is not being performed, the control command transmission unit 124 may first transmit the sub-control command for each layer corresponding to a layer to be output from the three-dimensional printer 130. The control command transmission unit 124 may store an index of the layer or an ID of the sub-control command for the layer in order to confirm a current output position. When the output work of the three-dimensional printer is already being performed, the control command transmission unit 124 may confirm the index of a layer which is currently being outputted or the ID of the sub-control command for each layer corresponding to the layer which is currently being outputted. Next, the control command transmission unit 124 may transmit the sub-control command corresponding to a next layer to the three-dimensional printer 130. Similarly, the control command transmission unit 124 may store the index of the layer or the ID of the sub-control command for the layer in order to confirm the current output position. The control command transmission unit 124 may repeatedly perform the operations described above until every sub-control command is transmitted.

For the output work of the three-dimensional printer 130, a method of sequentially transmitting the sub-control commands to the three-dimensional printer 130 one by one may control the output work of the three-dimensional printer 130 more effectively compared with a method of simultaneously transmitting the output file (for example, the STL file) or a machine code to the three-dimensional printer 130.

The printer monitoring unit 125 may obtain the status information of the three-dimensional printer 130 by interworking with the printer control unit 131 included in the three-dimensional printer 130. The status information may include an operating status of the three-dimensional printer 130 (for example, during an idle or output state), output work information, output progress status, an index representing a layer which is being output (for example, the ID of the sub-control command corresponding to the layer) and/or a remaining amount of a printing material.

As described above, the three-dimensional printer 130 may perform the output work for outputting the three-dimensional object according to the control command. After generating the control command, when a request for changing the shape of the three-dimensional object is received during the output work, an operation of the three-dimensional printing control apparatus 120 will be described in more detail below. The following description related to a shape and/or other several features of the three-dimensional object output from the three-dimensional printer 130, an output method of the three-dimensional printer 130, a build space, the number of layers in and/or other several features of the build space, several features such as a method representing the modeling information of the three-dimensional object (for example, a format of the three-dimensional object file), and operations of the three-dimensional printing control apparatus 120 is merely an example.

First, for convenience of explanation, suppose that the three-dimensional printer 130 is outputting the three-dimensional object having a first shape (for example, a square pillar shape). As described above, when the user requests the output of the three-dimensional object by selecting the three-dimensional object file representing the three-dimensional object, the file conversion unit 121 may convert the selected three-dimensional object file into a STL file, and transmit the converted STL file to the control command generation unit 122. The STL file may also include the modeling information of the three-dimensional object. Accordingly, the control command generation unit 122 may obtain the modeling information of the three-dimensional object having the first shape from the STL file according to the request of the user for the output of the three-dimensional object. Hereinafter, the STL file may be referred to as a first STL file.

The control command generation unit 122 may generate a first control command for allowing the three-dimensional printer 130 to output the three-dimensional object having the first shape in the build space of the three-dimensional printer 130 using the first STL file. In detail, the control command generation unit 122 may divide the first control command into first sub-control commands corresponding to each of the plurality of layers in the build space of the three-dimensional printer 130. The control command transmission unit 124 may sequentially transmit the first sub-control commands to the three-dimensional printer 130 one by one. The three-dimensional printer 130 may stack the materials in units of layers in the build space of the three-dimensional printer 130 in order to output the three-dimensional object having the first shape according to the received first sub-control commands. For example, when the first sub-control commands corresponding to each of layers (that is, layers in which the materials are first stacked) located at a lower portion are sequentially transmitted to the three-dimensional printer 130, the three-dimensional printer 130 may output a portion of three-dimensional object having the first shape (for example, a small area square pillar which is a lower half portion of a square pillar).

While performing the output work, the user may want to change the shape of the three-dimensional object. The modeling conversion unit 126 may receive a request by the user while performing the output work for the three-dimensional object in order to change the three-dimensional object from the first shape to a second shape different from the first shape (for example, a structure in which the lower half portion has a square pillar shape and an upper half portion has a pillar shape which is gradually tapered). For this, the modeling conversion unit 126 may provide a notification of indicating a portion which it is possible for the user to change in the three-dimensional object having the first shape (for example, a non-printed portion in the three-dimensional object having the first shape) so as to recognize the portion. The notification may be generated based on the status information (for example, the index indicating the layer which is being output or the ID of the sub-control command corresponding to the layer) obtained by the printer monitoring unit 125, and the generated notification may be displayed on the display device.

The modeling conversion unit 126 may convert the modeling information with respect to the initial three-dimensional object having the first shape into the modeling information with respect to the changed three-dimensional object having the second shape according to the request described above. Further, the modeling conversion unit 126 may generate the new three-dimensional object file including the converted modeling information. The file conversion unit 121 may receive the new three-dimensional object file from the file storage unit 110, and convert the received new three-dimensional object file into a second STL file. Next, the control command generation unit 122 may receive the second STL file from the file conversion unit 121. Accordingly, the control command generation unit 122 may obtain the modeling information of the changed three-dimensional object having the second shape from the second STL file according to the user request for changing the shape of the three-dimensional object.

Figure 2:
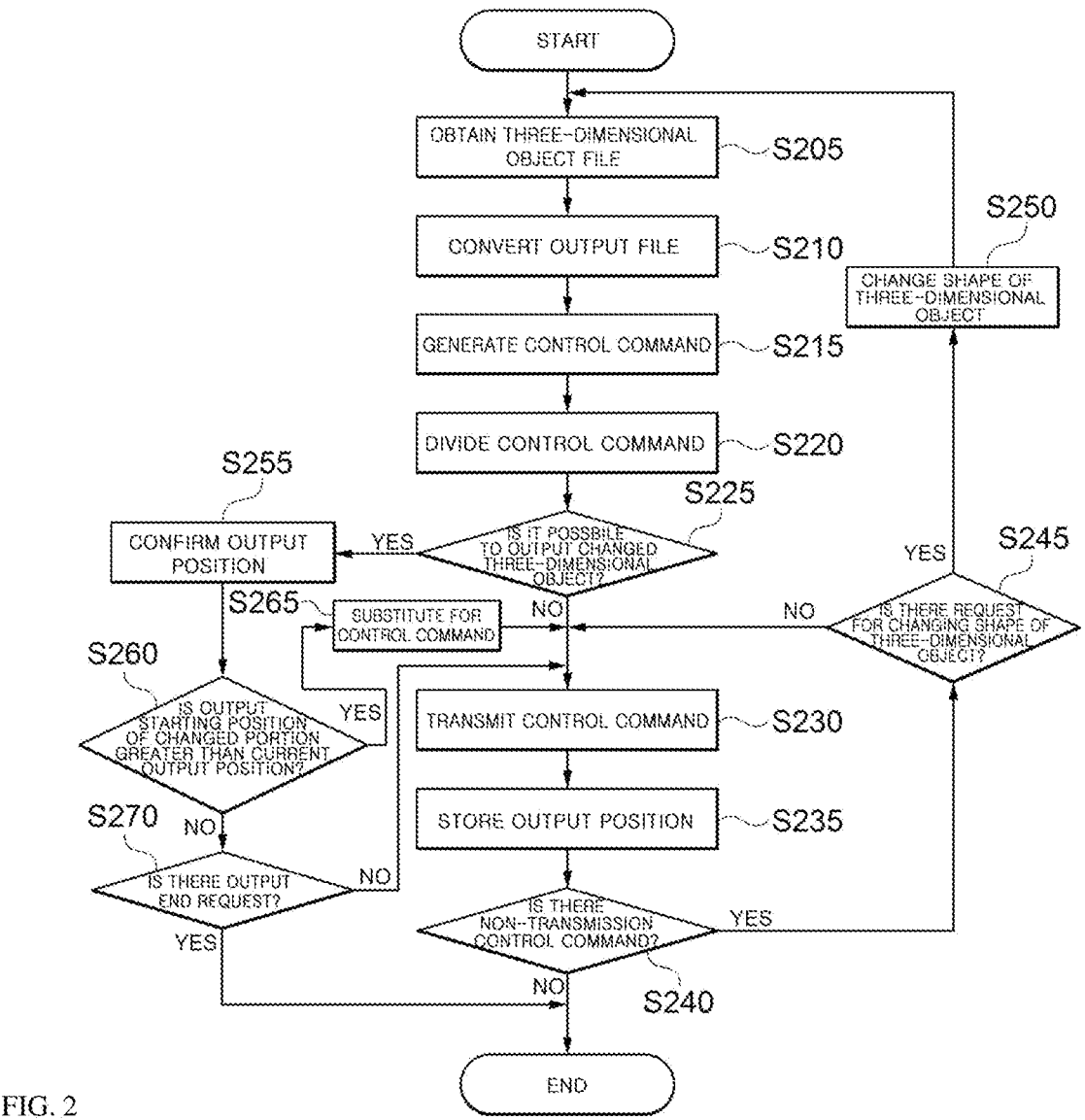
FIG. 2 is a diagram for describing a three-dimensional printing control method according to an exemplary embodiment of the disclosure.

The control command generation unit 122 may generate an additional control command for outputting the changed three-dimensional object (that is, having the second shape) based on the second STL file. For example, the control command generation unit 122 may generate a second control command for allowing the three-dimensional printer 130 to output the changed three-dimensional object in the build space of the three-dimensional printer 130. In detail, as shown in FIG. 2, the control command generation unit 122 may divide the second control command into second sub-control commands corresponding to each of the plurality of layers in the build space of the three-dimensional printer 130.

The control command transmission unit 124 may identify the portion which is changed from the first shape to the second shape (hereinafter, it may be referred to as a "changed portion") according to the request for changing the shape of the initial three-dimensional object as a specific portion of the changed three-dimensional object, and substitute the second control command for the first control command for the non-printed portion of the initial three-dimensional object. In detail, the control command transmission unit 124 may determine whether the changed three-dimensional object is able to be output by substituting for the initial three-dimensional object through the output work when the changed portion is output instead of at least one portion in the non-printed portion of the initial three-dimensional object in the output work while being performed. For example, for the determination, the control command transmission unit 124 may compare a position (for example, a position of the layer of dividing the square pillar in half in a longitudinal direction) in which the output of the non-printed portion (for example, the upper half portion of the square pillar described above) of the initial three-dimensional object is started according to the first control command and a position (for example, a position of the layer of dividing the structure in half in a longitudinal direction) in which the output of the changed portion (for example, the tapered pillar portion of the structure described above) is started according to the second control command, in the build space of the three-dimensional printer 130.

In response to the determination indicating that the changed three-dimensional object is able to be output through the output work instead of the initial three-dimensional object, the control command transmission unit 124 may transmit at least one portion among the second sub-control commands to the three-dimensional printer 130. The control command transmission unit 124 may sequentially transmit the second sub-control commands (for example, the second sub-control commands corresponding to the layers which are not yet used in the current output work among the layers in the build space of the three-dimensional printer 130) to the three-dimensional printer 130 one by one. Further, the control command transmission unit 124 may suspend the sequential transmission of the first sub-control commands while starting the sequential transmission of the second sub-control commands. In other words, the second sub-control commands may be applied to the plurality of layers which are not yet used in the current output work instead of the corresponding first sub-control commands. The three-dimensional printer 130 may sequentially stack the materials in units of layers in the build space of the three-dimensional printer 130 for outputting the three-dimensional object having the second shape according to the received second sub-control commands. Finally, the three-dimensional printer 130 may output the changed three-dimensional object in the build space of the three-dimensional printer 130.

When it is not possible to output the changed three-dimensional object through the current output work (for example, when the layer corresponding to the second sub-control command for outputting the changed portion is already used in the output work), the control command transmission unit 124 may inquire whether to suspend the current output work of the user. The control command transmission unit 124 may suspend the output work when receiving a request for ending the output work. Otherwise, the control command transmission unit 124 may continuously perform the output work using the first control command without substituting the second control command for the first control command with respect to the non-printed portion of the initial three-dimensional object.

The three-dimensional printing system 100 according to an exemplary embodiment of the disclosure may recognize a progress degree of the output work (for example, the number of layers which are already stacked through the output work), and change the control command for controlling the output work of the three-dimensional printer 130 even when the request for changing the shape of the three-dimensional object is received during the output work of the three-dimensional printer 130, and the three-dimensional printer 130 may output the changed three-dimensional object instead of the initial three-dimensional object without suspending the output work which is being performed. Accordingly, the waste of the printing material and the delay of the lead time may be prevented, and the user satisfaction with respect to the three-dimensional printing work can be improved more effectively.

The above modules of the three-dimensional printing control apparatus 120 may be implemented with hardware. For example, the three-dimensional printing control apparatus 120 may be implemented or included in a computing apparatus. The computing apparatus may include at least one processor and a computer-readable storage medium such as a memory that is accessible by the processor. The computer-readable storage medium may be disposed inside or outside the processor, and may be connected with the processor using well known means. A computer executable instruction for controlling the computing apparatus may be stored in the computer-readable storage medium. The processor may execute an instruction stored in the computer-readable storage medium. When the instruction is executed by the processor, the instruction may allow the processor to perform an operation according to an example embodiment. In addition, the computing apparatus may further include an interface device configured to support input/output and/or communication between the computing apparatus and at least one external device, and may be connected with an external device (for example, a device in which a system that provides a service or solution and records log data regarding a system connection is implemented). Furthermore, the computing apparatus may further include various different components (for example, an input device and/or an output device), and the interface device may provide an interface for the components. Examples of the input device include a pointing device such as a mouse, a keyboard, a touch sensing input device, and a voice input device, such as a microphone. Examples of the output device include a display device, a printer, a speaker, and/or a network card. Thus, the file conversion unit 121, the control command generation unit 122, the control command storage unit 123, the control command transmission unit 124, the printer monitoring unit 125, and the modeling conversion unit 126 of the three-dimensional printing control apparatus 120 may be implemented as hardware of the above-described computing apparatus.

Hereinafter, a three-dimensional printing control method according to an exemplary embodiment of the disclosure will be described with reference to FIG. 2. For example, operations included in a three-dimensional printing control method 200 according to an exemplary embodiment of the disclosure shown in FIG. 2 may be performed by the three-dimensional printing control apparatus 120.

After a start operation, the method 200 may be started from an operation S205. In the operation S205, the three-dimensional object file may be obtained. For example, in response to the user request for the output of the three-dimensional object, the three-dimensional object file representing the three-dimensional object may be provided.

In an operation S210, the three-dimensional object file may be converted into the output file of a common format supported by the three-dimensional printer (for example, the three-dimensional printer 130).

In an operation S215, the control command for outputting the three-dimensional object may be generated based on the modeling information with respect to the three-dimensional object.

In an operation S220, the generated control command may be divided into the sub-control commands for each of the plurality of layers.

In an operation S225, whether the shape of the three-dimensional object is changed may be determined during the output work. When the changed three-dimensional object is not output, the sub-control command corresponding to the layer to be output from the three-dimensional printer may be transmitted (S230). The index of the layer or the ID of the sub-control command for the layer may be stored in order to confirm the current output position (S235). In an operation S240, it may be determined whether there is the sub-control command which is not yet transmitted. When every sub-control command is transmitted, the method 200 may be ended. When there is the sub-control command which is not yet transmitted, it may be determined whether there is the request for changing the shape of the three-dimensional object (S245). When the request is not received, the operations S230 to S240 may be repeated.

Meanwhile, when there is the request for changing the shape of the three-dimensional object based on the determination of the operation S245, the modeling information of the three-dimensional object may be converted to have the changed shape according to the request, and the new three-dimensional object file including the converted modeling information may be generated (S250). Next, the operations S205 to S225 may be repeated with respect to the new three-dimensional object file. The output work for outputting the new three-dimensional object having the changed shape may be performed, and the method 200 may be branched off from the operation S225 to an operation S255.

In the operation S255, the current output position may be confirmed. In an operation S260, the position in which the output of the changed portion of the new three-dimensional object is started in the build space of the three-dimensional printer and the current output position may be compared. When the output start position of the changed portion is higher than the current output position, a new control command may substitute for the current control command with respect to the non-printed portion of the initial three-dimensional object (S265). Accordingly, the sub-control commands generated for the changed three-dimensional object may be transmitted for the non-printed portion. When the output start position of the changed portion is not higher than the current output position, an inquiry regarding whether to suspend the output work may be provided to the user, and whether the request for ending the output work is received from the user may be determined (S270). When the request is received, the method 200 may be ended, and otherwise, the method 200 may proceed to the operation S230 without substituting for the control command.

The exemplary embodiment according to the disclosure may include a computer readable recording medium in which a program for executing the method described above in a computer is stored. The computer readable recording medium may include a program instruction, a local data file, a local data structure, etc. alone or in combination. The computer readable recording medium may be specially designed and be configured for the disclosure. Examples of the computer readable recording medium may include a hard disk, a magnetic media such as a floppy disk and a magnetic tape, an optical media such as a compact disk (CD)-ROM and a digital versatile disk (DVD), a magneto-optical media such as a floptical disk, and a hardware device which is specially configured to store and execute a program such as a ROM, a RAM, a flash memory, etc. Examples of the program instruction may include not only a machine code made by a compiler but also a high-level language code which is executable by a computer using an interpreter, etc. According to another exemplary embodiment, a computer program for executing the method described above may be provided. The program may be stored in a medium such as the computer readable recording medium in order to execute the method described above in combination with hardware.

According to exemplary embodiments of the disclosure, when the request for changing the shape of the three-dimensional object while performing the work for outputting the three-dimensional object is received, the three-dimensional object can be output to have the changed shape during the current output work.

According to exemplary embodiments of the disclosure, the control command for controlling the three-dimensional printer may be generated, and the control command may process the printing material in units of layers, and thus the output work can be controlled precisely.

According to exemplary embodiments of the disclosure, the shape of the output result product manufactured by the three-dimensional printer may be changed during the output work, and the waste of the printing material and the delay of the lead time can be prevented.

While the exemplary embodiments of the disclosure are described in detail above, it will be understood by those of ordinary skill in the art that various changes and modifications in form and details may be made therein without departing from the spirit and scope as defined by the following claims. Accordingly, the scope of the disclosure should not be limited by the exemplary embodiments of the disclosure, and it is intended that the present disclosure covers all such modifications and changes by those of ordinary skill in the art derived from a basic concept of the appended claims, and their equivalents.

What is claimed is:

1. A three-dimensional printing control apparatus, comprising:
    a control command generator implemented by a non-transitory hardware device configured to:
        generate a control command for outputting a three-dimensional object having a first shape, and
        generate, in response to a request for changing a shape of the three-dimensional object from the first shape to a second shape is received while performing a output work for the three-dimensional object, an additional control command for outputting a changed three-dimensional object having the second shape; and
    a control command transmitter implemented by a second non-transitory hardware device configured to, in response to determining that it is possible to output the changed three-dimensional object through the output work, substitute the additional control command for the control command with respect to a non-printed portion of the three-dimensional object,
    wherein the control command transmitter is further configured to:
        identify a specific portion of the changed three-dimensional object,
        compare a first position in which the output of the non-printed portion is started according to the control command in a build space of a three-dimensional printer that is performing the output work and a second position in which the output of the specific portion is started according to the additional control command in the build space, and
        determine whether it is possible to output the changed three-dimensional object instead of the three-dimensional object through the output work based on a result of comparing the first and second positions when the specific portion is output instead of at least one portion of the non-printed portion in the output work,
    wherein the specific portion is a portion of the three-dimensional object that is changed from the first shape to the second shape according to the request, and
    wherein the control command transmitter is configured to, in response to determining that the second position in which the output of the specific portion is started is higher than the first position in which the output of the non-printed portion is started, transmit the additional control command substituted for the control command to a three-dimensional printer that is performing the output work so as to output the changed three-dimensional object having the second shape instead of the three-dimensional object having the first shape without suspending the output work which is being performed by three-dimensional printer.

2. The three-dimensional printing control apparatus of claim 1, wherein
    the control command comprises sub-control commands for each of a plurality of layers for allowing a three-dimensional printer to stack a material and output the three-dimensional object, and
    the additional control command comprises sub-control commands for each of a plurality of layers for allowing the three-dimensional printer to stack the material and output the changed three-dimensional object.

3. The three-dimensional printing control apparatus of claim 2, wherein the control command transmitter is further configured to:
    sequentially transmit the sub-control commands of the control command for each of the plurality of layers for the output work to the three-dimensional printer one by one, and
    suspend, in response to determining that it is possible to output the changed three-dimensional object through the output work, sequentially transmitting the sub-control commands of the control command while sequentially transmitting at least a portion of the sub-control commands of the additional control command for outputting the changed three-dimensional object.

4. The three-dimensional printing control apparatus of claim 1, wherein the control command generator is further configured to:
    generate the control command based on first modeling information with respect to the three-dimensional object, and
    generate the additional control command based on second modeling information with respect to the changed three-dimensional object.

5. The three-dimensional printing control apparatus of claim 4, further comprising:
    a modeling converter configured to convert the first modeling information into the second modeling information according to the request.

6. The three-dimensional printing control apparatus of claim 5, wherein the modeling converter is further configured to provide a notification indicating the non-printed portion.

7. The three-dimensional printing control apparatus of claim 6, further comprising:
    a printer monitor configured to obtain status information with respect to a three-dimensional printer that is performing the output work,
    wherein the modeling converter is further configured to provide the notification based on obtained the status information.

8. A three-dimensional printing control method, comprising:

generating a control command for outputting a three-dimensional object having a first shape;

generating in response to a request for changing a shape of the three-dimensional object from the first shape to a second shape is received while performing a output work for the three-dimensional object, an additional control command for outputting the three-dimensional object having the second shape; and substituting, in response to determining that it is possible to output the changed three-dimensional object through the output work, the additional control command for the control command with respect to a non-printed portion of the three-dimensional object, wherein the substituting comprises:
identifying a specific portion of the changed three-dimensional object;

comparing a first position in which the output of the non-printed portion is started according to the control command in a build space of a three-dimensional printer that is performing the output work and a second position in which the output of the specific portion is started according to the additional control command in the build space;

determining whether it is possible to output the changed three-dimensional object instead of the three-dimensional object through the output work based on a result of comparing the first and second positions when the specific portion is output instead of at least one portion of the non-printed portion in the output work, and transmitting, in response to determining that the second position in which the output of the specific portion is started is higher than the first position in which the output of the non-printed portion is started, the additional control command substituted for the control command to a three-dimensional printer that is performing the output work so as to output the changed three-dimensional object having the second shape instead of the three-dimensional object having the first shape without suspending the output work which is being performed by three-dimensional printer, and wherein the specific portion is a portion of the three-dimensional object that is changed from the first shape to the second shape according to the request.

9. The three-dimensional printing control method of claim 8, wherein
the control command comprises sub-control commands for each of a plurality of layers for allowing a three-dimensional printer to stack a material and output the three-dimensional object, and
the additional control command comprises sub-control commands for each of a plurality of layers for allowing the three-dimensional printer to stack the material and output the changed three-dimensional object.

10. The three-dimensional printing control method of claim 9, further comprising:
sequentially transmitting the sub-control commands of the control command for each of the plurality of layers for the output work to the three-dimensional printer one by one; and
suspending, in response to determining that it is possible to output the changed three-dimensional object through the output work, sequentially transmitting the sub-control commands of the control command while sequentially transmitting at least a portion of the sub-control commands of the additional control command for outputting the changed three-dimensional object.

11. The three-dimensional printing control method of claim 8, wherein
the generating the control command comprises generating the control command based on first modeling information with respect to the three-dimensional object, and
the generating the additional control command comprises generating the additional control command based on second modeling information with respect to the changed three-dimensional object.

12. The three-dimensional printing control method of claim 11, further comprising:
converting the first modeling information into the second modeling information according to the request.

13. The three-dimensional printing control method of claim 12, further comprising:
providing a notification indicating the non-printed portion.

14. The three-dimensional printing control method of claim 12, further comprising:
obtaining status information with respect to a three-dimensional printer that is performing the output work; and
providing a notification indicating the non-printed portion based on the obtained status information.

15. A computer program stored on a non-transitory computer readable storage medium for controlling a hardware to execute a method, the method comprising:
generating a control command for outputting a three-dimensional object having a first shape;

generating in response to a request for changing a shape of the three-dimensional object from the first shape to a second shape is received while performing a output work for the three-dimensional object, an additional control command for outputting the three-dimensional object having the second shape; and substituting, in response to determining that it is possible to output the changed three-dimensional object through the output work, the additional control command for the control command with respect to a non-printed portion of the three-dimensional object, wherein the substituting comprises:
identifying a specific portion of the changed three-dimensional object;

comparing a first position in which the output of the non-printed portion is started according to the control command in a build space of a three-dimensional printer that is performing the output work and a second position in which the output of the specific portion is started according to the additional control command in the build space;

determining whether it is possible to output the changed three-dimensional object instead of the three-dimensional object through the output work based on a result of comparing the first and second positions when the specific portion is output instead of at least one portion of the non-printed portion in the output work, and transmitting, in response to determining that the second position in which the output of the specific portion is started is higher than the first position in which the output of the non-printed portion is started, the additional control command substituted for the control command to a three-dimensional printer that is performing the output work so as to output the changed three-dimensional object having the second shape instead of the three-dimensional object having the first shape without suspending the output work which is being performed by three-dimensional printer, and wherein the specific portion is a portion of the three-dimensional object that is changed from the first shape to the second shape according to the request.

16. A three-dimensional printing control apparatus, comprising:
a transmitter configured to communicate with a three-dimensional printer;
a memory having stored thereon computer program code; and
a controller configured to execute the computer program code to:
generate a first control command for instructing a printing of a three-dimensional object having a first shape by the three-dimensional printer;
control the transmitter to transmit the first control command to the three-dimensional printer;
generate, in response to receiving a request to change a shape of the three-dimensional object during the printing of the three-dimensional object, a second control command for instructing a printing of the three-dimensional object having a second shape;
determine whether the three-dimensional object having the second shape is printable using a printed portion of the three-dimensional object having the first shape;
substitute, in response to determining that the three-dimensional object having the second shape is printable using the printed portion of the three-dimensional object having the first shape, the second control command for the first control command with respect to a non-printed portion of the three-dimensional object; and
control the transmitter to transmit the second control command substituted for the first control command to the three-dimensional printer,
wherein the controller is further configured to execute the computer program code to:
determine a changed portion of the three-dimensional object having the second shape that differs from the three-dimensional object having the first shape; and
determine whether the changed three-dimensional object is printable using the printed portion of the three-dimensional object having the first shape by comparing a currently printing portion of the three-dimensional object with the changed portion,
wherein the controller is further configured to execute the computer program code to:
control the transmitter to transmit, in response to a currently printed layer of the three-dimensional object being a lower layer than each of at least one changed layer among a plurality of layers of the three-dimensional object having the second shape, the second control command substituted for the first control command to the three-dimensional printer so as to output the changed three-dimensional object having the second shape instead of the three-dimensional object having the first shape without suspending the output work which is being performed by three-dimensional printer.

17. The three-dimensional printing control apparatus of claim 16, wherein
the printing of the three-dimensional object comprises the three-dimensional printer printing a plurality of layers of the three-dimensional object, and
the controller is further configured to execute the computer program code to:
determine the at least one changed layer among the plurality of layers of the three-dimensional object having the second shape that differs from at least one corresponding layer of the plurality of layers of the three-dimensional object having the first shape; and
determine, in response to a currently printed layer of the three-dimensional object being a lower layer than each of the at least one changed layer, that the three-dimensional object having the second shape is printable using the printed portion of the three-dimensional object having the first shape.

18. The three-dimensional printing control apparatus of claim 17, wherein a lower layer is a layer that is to be printed by the three-dimensional printer before a higher layer.

19. The three-dimensional printing control apparatus of claim 16, wherein the controller is further configured to execute the computer program code to:
output, in response to determining that the three-dimensional object having the second shape is not printable using the printed portion of the three-dimensional object having the first shape, an inquiry regarding whether to stop the printing of the three-dimensional object to a user; and
control, in response to receiving an instruction to stop printing the three-dimensional object, the transmitter to transmit a command to stop printing the three-dimensional object to the three-dimensional printer.

20. The three-dimensional printing control apparatus of claim 19, wherein the controller is further configured to execute the computer program code to control, in response to receiving an instruction to continue printing the three-dimensional object having the first shape from the user, the transmitter to continue transmitting the first control command to the three-dimensional printer.

* * * * *